United States Patent
Gill et al.

(10) Patent No.: US 6,249,406 B1
(45) Date of Patent: *Jun. 19, 2001

(54) MAGNETORESISTIVE SENSOR WITH A SOFT ADJACENT LAYER HAVING HIGH MAGNETIZATION, HIGH RESISTIVITY, LOW INTRINSIC ANISOTROPY AND NEAR ZERO MAGNETOSTRICTION

(75) Inventors: Hardayal Singh Gill, Portola Valley; Mustafa Pinarbasi, Morgan Hill, both of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/717,518

(22) Filed: Sep. 23, 1996

(51) Int. Cl.$^7$ ................................................ G11B 5/127
(52) U.S. Cl. ...................................................... 360/324.11
(58) Field of Search .............................. 360/113, 324.1, 360/324.11; 338/32 R; 324/252

(56) References Cited

U.S. PATENT DOCUMENTS

| | | | |
|---|---|---|---|
| 3,864,751 | 2/1975 | Beaulieu et al. | 360/113 |
| 3,989,557 | 11/1976 | Henmi et al. | 148/120 |
| 4,578,728 | 3/1986 | Sakakima et al. | 360/125 |
| 4,608,297 | 8/1986 | Shimada | 428/215 |
| 4,663,607 | 5/1987 | Kitada et al. | 338/32 R |
| 4,879,619 | 11/1989 | Fontana, Jr. et al. | 360/113 |
| 4,933,209 * | 6/1990 | Anthony et al. | 427/127 |
| 4,994,320 | 2/1991 | Jagielinski | 428/336 |
| 5,001,586 | 3/1991 | Aboaf et al. | 360/113 |
| 5,031,063 | 7/1991 | Hasegawa | 360/120 |
| 5,258,884 | 11/1993 | Howard et al. | 360/113 |
| 5,285,339 * | 2/1994 | Chen et al. | 360/113 |
| 5,287,238 * | 2/1994 | Baumgart et al. | 360/113 |
| 5,337,203 | 8/1994 | Kitada et al. | 360/113 |
| 5,341,261 | 8/1994 | Dieny et al. | 360/113 |
| 5,515,221 * | 5/1996 | Gill et al. | 360/113 |
| 5,608,593 * | 3/1997 | Kim et al. | 360/113 |
| 5,666,246 * | 9/1997 | Gill et al. | 360/113 |
| 5,673,162 * | 9/1997 | Saito | 360/113 |

FOREIGN PATENT DOCUMENTS

| | | |
|---|---|---|
| 60-22726 * | 2/1985 | (JP) . |
| 5-36033 | 2/1993 | (JP) . |

OTHER PUBLICATIONS

Ravipatt et al, Magnetic properties of CoFeB sputtered films for high Bsat applications, American Institute of Physics, p. 5011, Apr. 1996.*

K. Yamada et al., "Shielded Magnetoresistive Head for High Density Recording", *IEEE Transactions on Magnetics*, vol. 26, No. 6, Nov. 1990.

K. Yamada, "Magnetoresistive Head for High Density Magnetic Recording", *IEEE Translation Journal on Magnetics in Japan*, vol. 8, No. 4, Apr. 1993.

* cited by examiner

Primary Examiner—David Davis
(74) Attorney, Agent, or Firm—Gary Cary Ware & Freidenrich LLP; Ervin F. Johnson

(57) ABSTRACT

A high magnetization, high resistivity, low corrosion and near zero magnetostriction soft adjacent layer (SAL) is provided for a magnetoresistive (MR) sensor of a read head. The MR sensor may either be an anisotropic MR (AMR) sensor or a spin valve sensor. In both sensors the SAL is CoHfNb or CoHfNbFe. The Hf is added to reduce corrosion and the Hf and Nb are balanced to provide near zero magnetostriction. The addition of Fe is an enhancer for reducing negative magnetostriction without diluting the magnetism of the alloy. Since CoHfNb has significantly higher magnetization than NiFeCr the SAL layer of CoHfNb can be thinner than the SAL of NiFeCr which results in a significantly higher resistance SAL. The higher resistance SAL equates to less shunting of the sense current through the SAL and better signal performance of the MR read head.

13 Claims, 6 Drawing Sheets

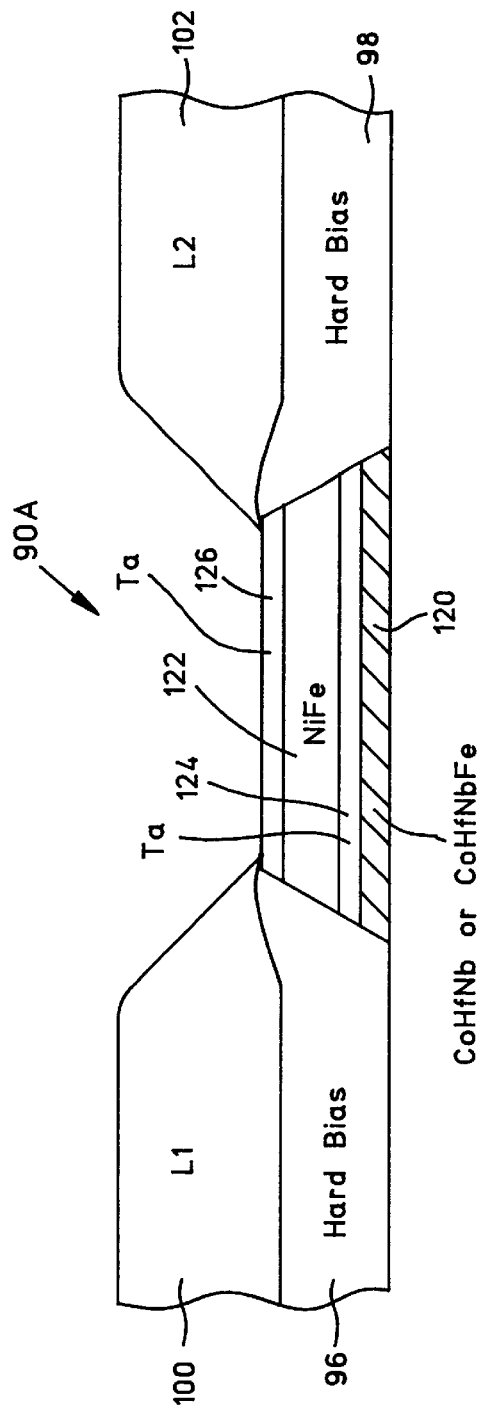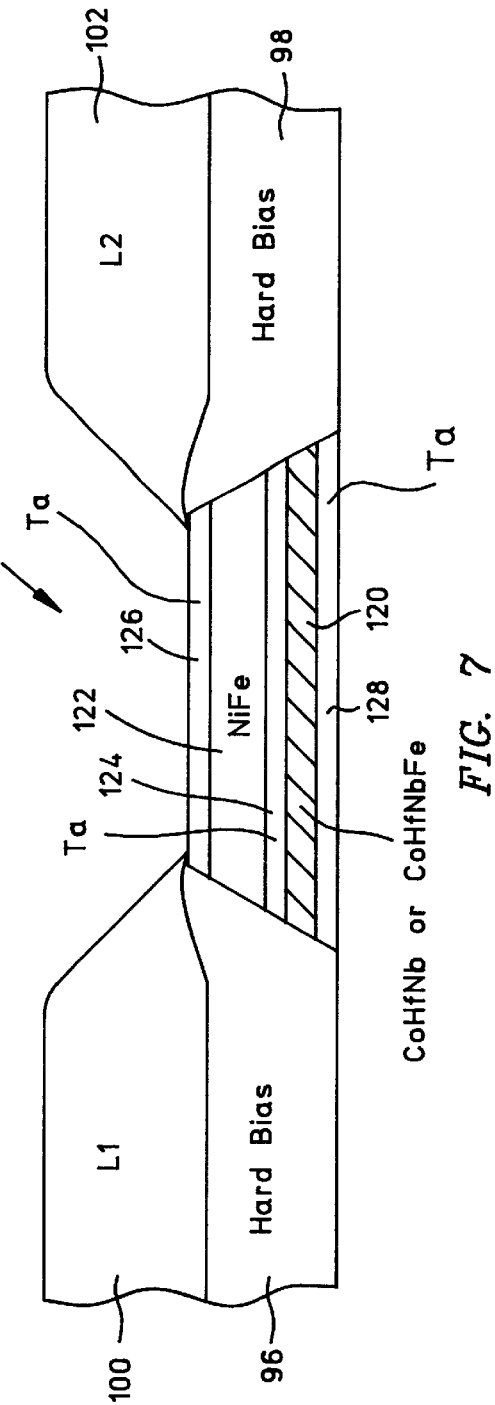

MAGNETORESISTIVE SENSOR WITH A SOFT ADJACENT LAYER HAVING HIGH MAGNETIZATION, HIGH RESISTIVITY, LOW INTRINSIC ANISOTROPY AND NEAR ZERO MAGNETOSTRICTION

BACKGROUND OF THE INVENTION

1. Field of the Invention

The present invention relates to a magnetoresistive (MR) sensor with a soft adjacent layer (SAL) having high magnetization, high resistivity, low intrinsic anisotropy and near zero magnetostriction, wherein the sensor is an anisotropic MR sensor or a spin valve sensor.

2. Description of the Related Art

A well-known magnetoresistive (MR) head configuration employs an anisotropic magnetoresistive (AMR) sensor sandwiched between a first gap layer and a second gap layer. These gap layers are, in turn, sandwiched between a first shield layer and a second shield layer. An AMR sensor typically includes a ferromagnetic MR stripe and a layer of soft magnetic material spaced from the MR stripe by a spacer layer of insulative material. The layer of soft magnetic material, referred to as the "soft adjacent layer" (SAL), produces a transverse bias in the MR stripe. In this regard, an MR stripe has a magnetic moment which is biased at an angle to an air bearing surface (ABS) of the head by the SAL. Other layers in an AMR sensor may include a seedlayer for the MR stripe and a capping layer. First and second leads are connected to the MR sensor for conducting a sense current through the sensor. When the MR stripe is in a magnetic field emanating from a moving magnetic medium, such as a rotating magnetic disk, the resistance of the MR stripe changes according to the function $\cos^2 \theta$, where $\theta$ is the angle of the magnetic moment to the ABS. With a constant sense current, the resistance change produces a voltage change that is detected as a readback signal.

The bias produced by the SAL depends upon the sense current. When the sense current is conducted through the MR stripe, the MR stripe produces a sense current field that is coupled to the SAL. This causes the SAL to produce a demagnetization (demag) field or stray field that is coupled to the MR stripe. The field coupled to the MR stripe rotates the magnetic moment of the MR stripe from a position parallel to the ABS to an angle to the ABS. At a rotation of 45°, the MR stripe is biased to a generally linear portion of its response curve. Other schemes have been proposed for biasing the MR stripe, however, the SAL scheme is the most common because it does not require a separate current source. However, it is known that a SAL shunts a portion of the sense current between the first and second leads, which are connected to all of the layers of the AMR sensor. Accordingly, it is important that a SAL material be selected that has a high resistance without sacrificing other desirable properties for a SAL.

The desirable properties for a SAL are as follows:

(1) high resistivity;
(2) high magnetization;
(3) soft magnetic properties;
(4) near zero magnetostriction;
(5) thermal stability;
(6) corrosion resistant;
(7) low MR coefficient; and
(8) low coercivity.

High resistivity has already been explained, high SAL magnetization desirably maximizes the bias of the MR stripe. Soft magnetic properties are important because the material can be saturated with a small applied field ($H_K$). An $H_K$ of less than 15 Oe is desirable. Near zero magnetostriction is important to minimize a stress-induced anisotropic field. The stress-induced anisotropic field either adds to or subtracts from the intrinsic anisotropic field of the SAL, depending upon whether magnetostriction is positive or negative. The magnitude of a stress-induced anisotropic field is unpredictable and can increase dramatically after lapping the ABS of the head.

It is important that the SAL material be thermally stable during high temperatures as may be reached during fabrication of the head or during operation. It is important that the material not change from an amorphous state to a crystalline state during these high temperatures.

Since an edge of the SAL is exposed at the ABS it is important that the material selected for the SAL be corrosion resistant. Corrosion changes the properties of the material. The resistance to corrosion is also important for enhancing the thermal stability of the head. If the material is corrosion resistant the material is less likely to change its composition by reacting with adjacent thin film layers. As is known, such a change in composition can dramatically change the properties of the SAL material.

A low MR coefficient is important so that the SAL does not compete with the MR coefficient of the MR stripe. It is also desirable that the magnetization of the material is uniform and that its magnetic moment can be smoothly switched upon the application of positive and negative applied fields.

A typical material employed for the SAL is NiFeCr. NiFeCr exhibits the above properties to an acceptable degree. However, if one or more of these properties can be improved, the performance of the head can be dramatically improved. For instance, if the magnetization of the SAL material can be improved then the resistance of the SAL can be improved. Assume that a predetermined bias field is required to bias the MR stripe and that material A with a predetermined thickness will supply the required bias field. Assume that material B has a higher magnetization than material A and has approximately the same resistivity as material A. Then a thinner layer of material B can be employed for supplying the required bias field. Furthermore, the resistance of the SAL will be higher with material B than with material A. Therefore, use of material B will reduce shunting of the sense current through the SAL.

Manifestly, careful selection of a soft magnetic material may result in improvement in SAL performance in more than one respect.

U.S. Pat. No. 4,994,320 teaches the use of CoZr based materials for a SAL. The patent states that CoZr exhibits instability of the anisotropy field when it is made thin enough (200–1,000 Å) to be employed as a SAL. The patent also suggests substituting Hf or Nb for Zr. In order to correct the instabilities, the patent teaches depositing a first cladding layer of $SiO_2$, depositing by sputtering the cobalt alloy along with silicon on the first cladding layer and then depositing a second cladding layer of $SiO_2$ on top of the sputtered layer. While not addressed in the patent it is believed that the instability of the anisotropy field of CoZr is due to poor magnetostriction and poor corrosion resistance. High magnetostriction is inherent in CoZr and will result in an unstable anisotropy field. Poor corrosion resistance will permit the material to corrode or react with adjacent layers at high temperatures which will change the anisotropy field.

A published Japanese patent application No. 5-36033 teaches the use of thin (2–100 Å) CoHfNb layers laminated with a thin (2–100 Å) nonmagnetic metal layer for use in magnetic recording head. The nonmagnetic metal layer is sandwiched between the CoHfNb layers. Although not addressed in the patent the laminated layers are apparently employed to produce a giant magnetoresistance (GMR) effect. This application is non-analogous to the function of a SAL. CoHfNb has also been employed for write poles in write heads and as shield layers in MR read heads. These applications are also non-analogous to the function of a SAL.

In IEEE Transactions on Magnetic, Vol 26, No. 6 dated November 1990, Yamada et al. teach the use of CoZrMo as a SAL for an AMR sensor. Mo was employed in the alloy to decrease the uniaxial anisotropy (HK) so that the SAL could be saturated by the sense current field from the MR stripe. Unfortunately, Mo seriously degrades the magnetization of Co. Further, in IEEE Translation Journal on Magnetics in Japan, Vol 2, No. 4 dated April 1993 Yamada reports degradation of CoZrMo when subjected to heat during fabrication or operation.

An IBM development employs a SAL in a spin valve sensor. A spin valve sensor includes a non-magnetic conductive layer sandwiched between a pinned layer and a free layer. The pinned layer has its magnetic moment pinned in a predetermined direction, such as perpendicular to the ABS, while the free layer has its magnetic moment aligned along an easy axis parallel to the ABS, but free to rotate when subjected to a magnetic field. The magnetic moment of the pinned layer is typically pinned by exchange coupling with an anti-ferromagnetic layer. When the magnetic moments of the free and pinned layers are parallel, the resistance of the spin valve is at a minimum; when the magnetic moments of the free and pinned layers are anti-parallel, the resistance of the spin valve is at a maximum. Accordingly, the relative rotation of the magnetic moments of the pinned and free layers changes the resistance of the spin valve. These changes produce voltage changes that are detected by circuitry to produce a readback signal. The IBM development teaches the use of a SAL as a "keeper" for minimizing a demagnetization (demag) field from the pinned layer. An insulative or conductor spacer layer is sandwiched between the frce layer and the SAL. When sense current is conducted through the spin valve sensor a sense current field from the free layer is induced on the pinned layer.

During normal operation, the temperature of the spin valve sensor may rise. Unfortunately, as the temperature increases the magnitude of the exchange pinning field falls. Without the SAL as a keeper, the demag field will, at some temperature, exceed the exchange pinning field causing the magnetic moment of the pinned layer to become disoriented. With the SAL as a keeper, the demag field from the pinned layer is attracted by the SAL and reduced virtually to zero. With this arrangement, disorientation of the magnetic moment of the pinned layer is expected to occur at a much higher temperature.

The aforementioned properties which are desirable for a SAL for an AMR sensor also apply to a SAL for a spin valve.

SUMMARY OF THE INVENTION

The present invention provides several embodiments of alloys which can be employed in an AMR sensor or a spin valve sensor to significantly increase the efficiency of the sensor. One of these alloys is CoHfNb and the other is CoHfNbFe. These alloys demonstrate enhancements in most of the aforementioned desirable properties for a SAL. For instance, these alloys have almost twice the magnetization of the typical NiFeCr SALs. A CoHfNb SAL or a CoHfNbFe SAL can be about ½ as thick as a NiFeCr SAL and produce the same bias field. A very desirable result from this arrangement is a tripling of the resistance of the SAL. This results in a significant reduction of the percentage of the sense current shunted through the SAL. Improvement in the MR coefficient can be as much as 30–35% and the raw signal improvement can be as much as 50%.

It is known that Nb changes Co from a crystalline state to an amorphous state more quickly than HF. Maintenance of the amorphous state of the SAL permits various thicknesses of the SAL to be employed without changes of the properties of the material. Nb also makes a fast negative change to the magnetostriction of the material. Hf causes a positive change to the magnetostriction and so is employed to bring the magnetostriction to near zero. It should be kept in mind however, that both Hf and Nb dilute the magnetism of Co, and should be used sparingly. We have discovered that Fe can be added to the alloy to drive the magnetostriction in a positive direction more quickly than Hf, without diluting the magnetism. In order to ameliorate the dilution problem, Fe is substituted for a portion of the Nb in one of the embodiments to establish a near zero magnetostriction. At least 5% Nb is required to make the alloy amorphous. With nothing else the alloy has a very negative magnetostriction. In the first embodiment Hf is added to establish near zero magnetostriction and in the second embodiment both HF and Fe are added to obtain near zero magnetostriction with improved magnetism. Either of these alloys is very desirable as a SAL for an AMR sensor or a spin valve sensor. As will be explained hereinafter both of these alloy have all of the desirable properties mentioned hereinabove for a SAL. We have also discovered that when these alloys are adjacent selected layers that some of their properties are improved.

An object of the present invention is to provide a more robust SAL for an MR read head.

Another object is to provide a SAL which has improved magnetization, improved corrosion resistance and near zero magnetostriction.

A further object is to provide a SAl, which shunt less sense current than NiFeCr and yet has all of the aforementioned desirable properties.

Other objects and attendant advantages of the present invention will be more fully appreciated after reading the following description taken together with the accompanying drawings.

DESCRIPTION OF THE DRAWINGS

FIG. 6 shows an enlarged ABS view of one embodiment of the AMR sensor.

FIG. 7 shows an enlarged ABS view of a second embodiment of the AMR sensor.

DESCRIPTION OF THE PREFERRED EMBODIMENTS

Figure 1:
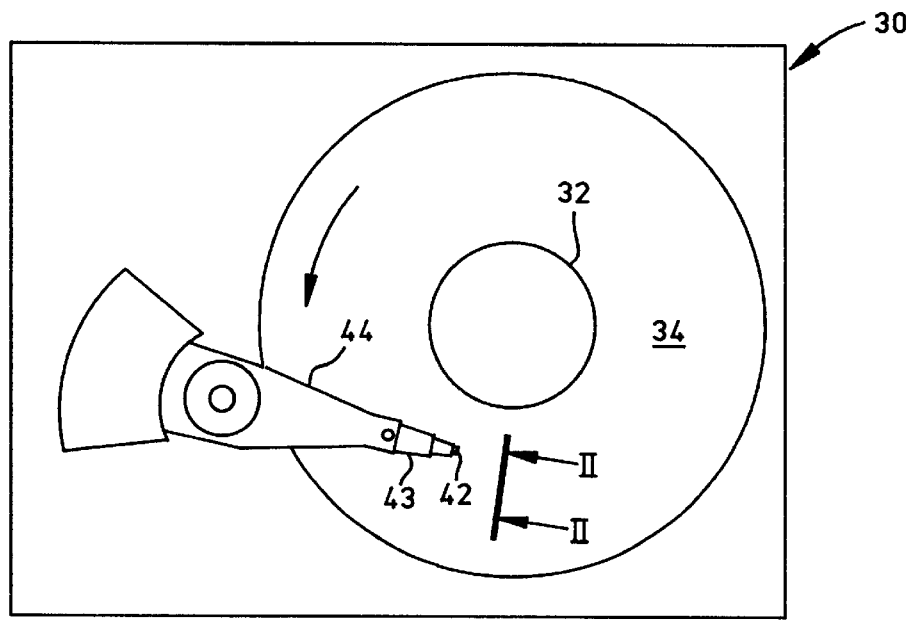
FIG. 1 is a planar view of a magnetic disk drive.
Figure 2:
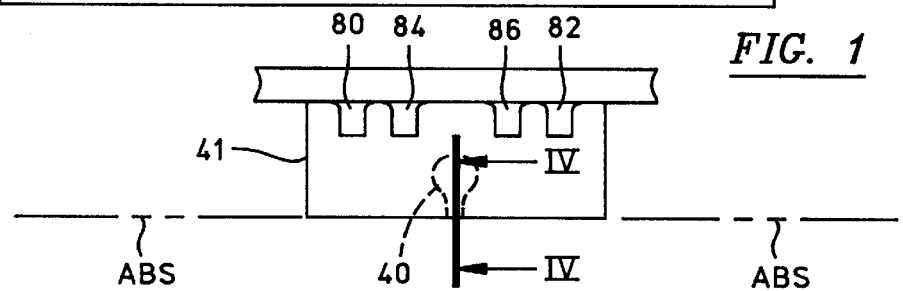
FIG. 2 is a view taken along plane II—II of FIG. 1.
Figure 3:
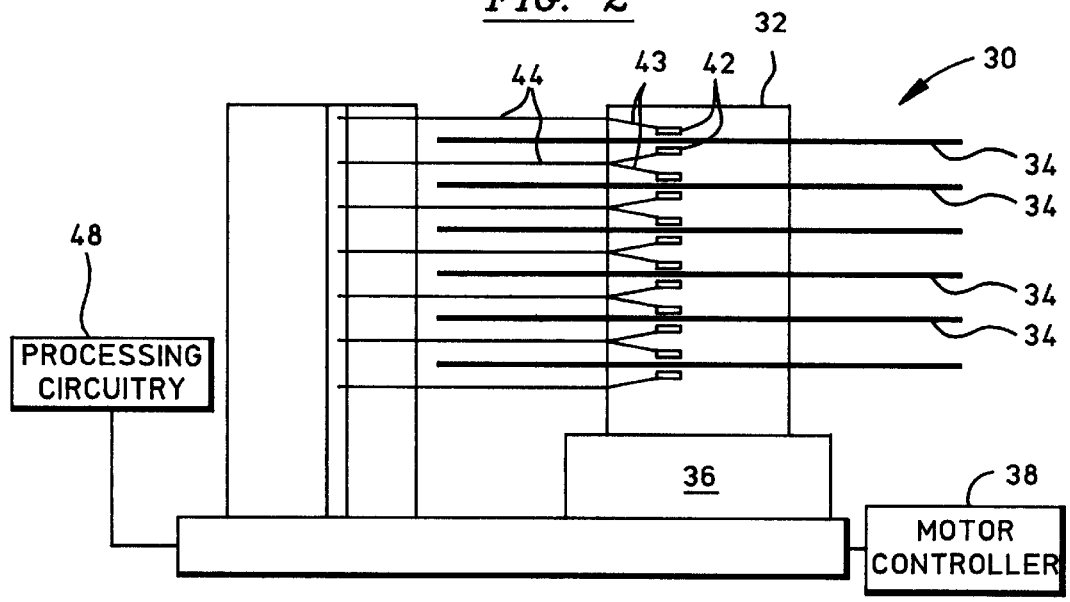
FIG. 3 is an elevation view of the magnetic disk drive of FIG. 1.

Referring now to the drawings wherein like reference numerals designate like or similar parts throughout the several views there is illustrated in FIGS. 1, 2 and 3 a magnetic disk drive 30. The drive 30 includes a spindle 32 which supports and rotates a magnetic disk 34. The spindle 32 is rotated by a motor 36 which in turn is controlled by motor controller 38. A magnetic head 40, which may be a merged MR head for recording and reading, is mounted on a slider 42 which, in turn, is supported by a suspension 43 and actuator arm 44. A plurality of disks, sliders and suspensions may be employed in a large capacity direct access storage device (DASD) as shown in FIG. 3. The suspension 43 and actuator arm 44 position the slider 42 to place the magnetic head 40 in a transducing relationship with a surface of the magnetic disk 34. When the disk 34 is rotated by the motor 36 the slider is supported on a thin (typically, 0.075 μm) cushion of air (air bearing) by the air bearing surface (ABS) 46. The magnetic head 40 is then employed for writing information to multiple circular tracks on the surface of the disk as well as for reading information therefrom. Processing circuitry 48 exchanges signals representing said information with the head 40, provides motor drive signals, and provides control signals for moving the slider to various tracks.

Figure 4:
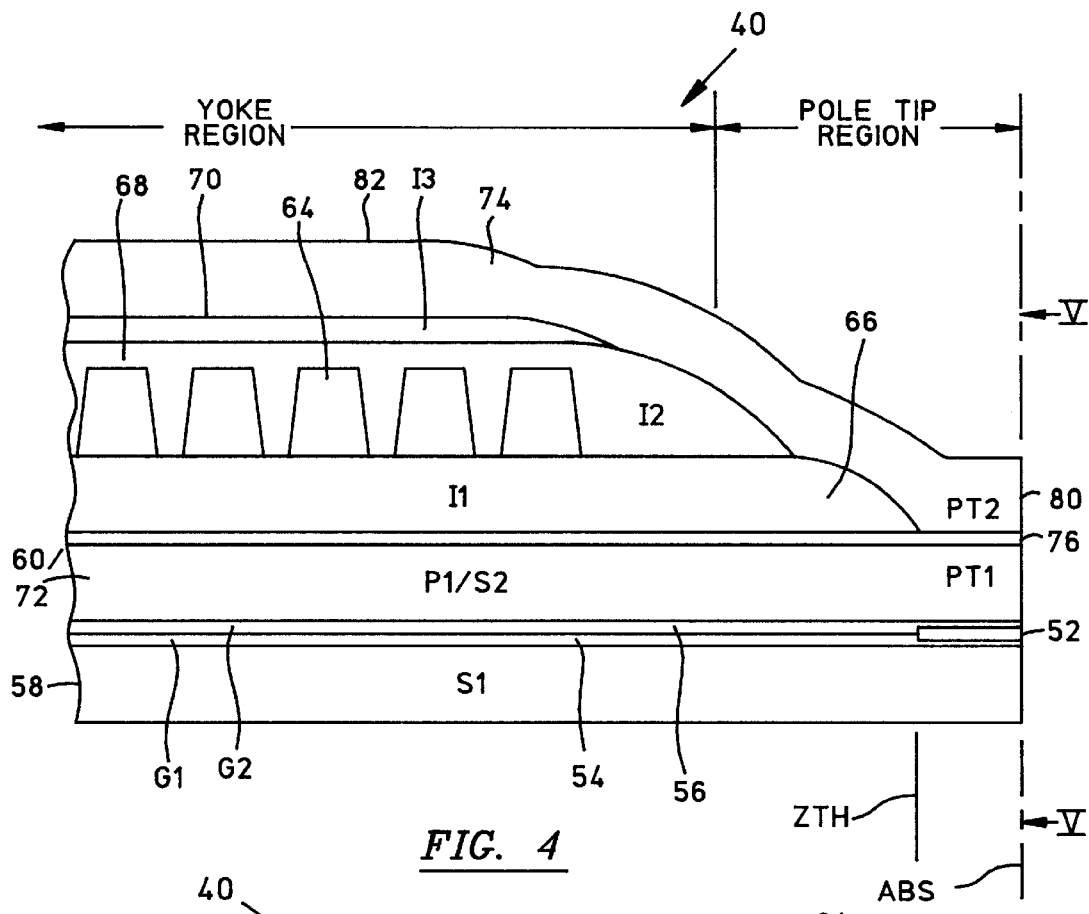
FIG. 4 is a view taken along plane IV—IV of FIG. 2 showing a cross section of a magnetic head.

FIG. 4 is a side cross-sectional elevation view of a merged MR head 40 which has a write head portion and a read head portion, the read head portion employing a spin valve MR sensor 52 of the present invention. The MR sensor 52 is sandwiched between the first and second gap layers 54 and 56, the first and second gap layers, in turn, being sandwiched between first and second shield layers 58 and 60. In response to external magnetic fields, the resistance of the MR sensor 52 changes. A sense current conducted through the sensor causes these changes to be manifested as potential changes. These potential changes are processed by the processing circuitry 38 shown in FIG. 3.

The write head portion of the head 40 includes a coil layer 64 which is sandwiched between first and second insulation layers 66 and 68. A third insulation layer 70 may be employed for planarizing the head to eliminate ripples in the second insulation layer caused by the coil layer 64. The coil layer 64, and the first, second and third insulation layers 66, 68 and 70 are sandwiched between first and second pole piece layers 72 and 74. The first and second pole piece layers 72 and 74 are separated by a write gap layer 76 at the ABS and are magnetically coupled at a back gap (not shown) which is spaced from the ABS. As shown in FIG. 2 first and second solder connections 80 and 82 connect leads (not shown) from the MR sensor 52 to leads (not shown) on the suspension 43 and third and fourth solder connections 84 and 86 connect leads (not shown) from the coil 64 to leads (not shown) on the suspension.

Figure 5:
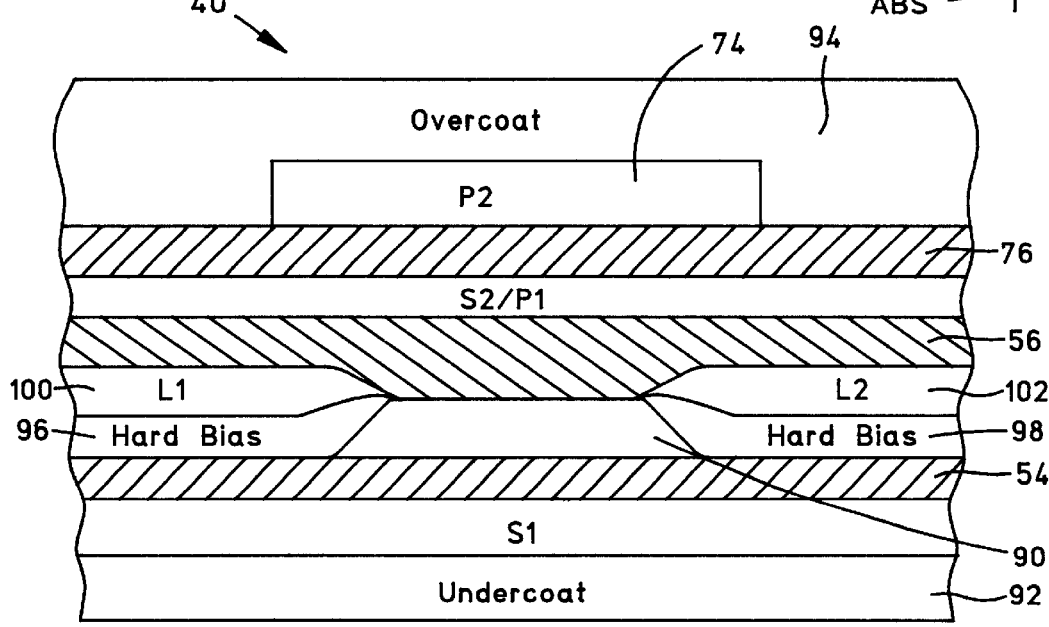
FIG. 5 is an ABS view taken along plane V—V of FIG. 4 showing the magnetic head with an AMR sensor with undercoat and overcoat layers added and the thicknesses of some of the layers increased disproportionately for emphasis.

FIG. 5 shows an ABS view of the head 40 with an anisotropic magnetoresistive (AMR) sensor 90 serving the function of the MR sensor 52 shown in FIG. 4. FIG. 5 has added an undercoat layer 92 and an overcoat layer 94 to show the relationship of these layers to the other layers of the head. First and second hard bias layers 96 and 98 may be employed at the side edges of the AMR sensor 90 for stabilizing the magnetic domains of the sensor. First and second leads 100 and 102 are connected to the side edges of the AMR sensor 90 for conducting the sense current therethrough. The hard bias layers 96 and 98 and the first and second lead layers 100 and 102 may be joined to the side edges of the AMR sensor 90 by contiguous junctions as shown in FIG. 5.

FIGS. 6, 7, 8 and 9 show embodiments 90A, 90B, 90C and 90D respectively of the AMR sensor 90 shown in FIG. 5. All of these embodiments employ a soft adjacent layer (SAL) which is composed of CoHfNb or CoHNbFe. We have found that the magnetization of CoNbHf is significantly greater than NiFeCr which is typically employed for a soft adjacent layer (SAL). The soft adjacent layers are shown cross-sectioned in FIGS. 6, 7, 8 and 9 for highlighting their locations. In the following table normalized rho (μ Ohm-cm) as well as other properties are listed for various alloys including CoNbHf and NiFeCr.

TABLE A

| Material | Physical Thick(Å) | Mag. Thick (NiFe Eq.) | Sheet R Ohms/Sq. | Rho μ Ohm-cm | Normalized Rho (μ Ohm-cm) |
|---|---|---|---|---|---|
| CoNb (Fe 2%) | 1075 | 1460 | 9.2 | 99 | 134 |
| CoNbHf | 1110 | 1400 | 9.15 | 101 | 128 |
| NiFeCr | 1324 | 895 | 5.3 | 70 | 47 |
| NiFeNb | 1915 | 2180 | 4.9 | 94 | 107 |

Normalized rho is a critical parameter which determines the suitability of a magnetic material for a soft adjacent layer. The normalized rho value is calculated using the NiFe equivalent magnetic thickness as follows:

Normalized rho=NiFe equivalent magnetic thickness÷physical thickness×resistivity.

These values are shown in Table A. It can be seen that the normalized rho for CoNbHf is 128 whereas the normalized rho for NiFeCr is 47. CoNbHf has 1.86 higher magnetization than NiFeCr which can be calculated by taking 1400÷1110/895÷1324 which is the ratio of normalized magnetic thicknesses of CoNbHf to NiFeCr. Accordingly, the thickness of CoNbHf required to obtain the same bias field as NiFeCr is 1÷1.86 which equals 0.529. Accordingly, the thickness of CoNbHf can be approximately one-half as thick as NiFeCr and obtain substantially the same bias field. The ratio of the resistivity of CoNbHf as compared to the resistivity of NiFeCr is 128÷47 which equals 2.72. This is obtained by dividing the normalized rho of CoNbHf by the normalized rho of NiFeCr. Accordingly, for the same bias field the CoNbHf soft adjacent layer is 2.72 more resistive to the sense current than a NiFeCr soft adjacent layer. Because of this additional resistance, when CoNbHf is employed as a soft adjacent layer, significantly less sense current is shunted through the SAL. It should be noted that the alloy CoNbFe has a high normalized rho of 134. This shows excellent soft magnetic properties, however, this alloy is not as corrosion-resistant as CoHfNb.

Table B shows the normalized rho as well as other magnetic properties for CoNbHf, NiFeCr and other alloys after annealing.

TABLE B

| Material | Thick (Å) | Hc (Oe.) | Hk (Oe.) | Lambda (×10-6) | Normalized Rho ($\mu$ Ohm-cm) |
|---|---|---|---|---|---|
| CoNbFe(2%) | 121 | 1.59 | 18.9 | 2.35 | 116 |
| CoNbHf | 186 | 2.35 | 14.6 | -2.6 | 122 |
| NiFeCr | 112 | 0.7 | 3.0 | -1.5 | 44 |
| NiFeNb | 103 | 1.5 | 11.0 | 65.0 | 105 |

This table shows that the normalized rho for CoNbHf has not changed much after annealing. The coercivity $H_c$ is 2.35 Oe which is within the acceptable level of below 2.5 Oe. The problem with a high coercivity $H_c$ is that the material acts as a hard magnet and is not in a single domain state. Further, the uniaxial anisotropy $H_K$ is 14.6 which is within an acceptable range of below 15 Oe. The magnetostriction is slightly negative at $-2.6 \times 10^{-6}$ which is within an acceptable range. This magnetostriction has been brought to an acceptable level by an appropriate combination of Nb and Hf. The addition of only Nb to Co makes the magnetostriction of the CoNb alloy very negative. The element Hf is added to bring the magnetostriction to a near zero level. The hafnium is also employed for providing the CoNbHf alloy with superior corrosion resistance. CoNbHf is approximately one-half as corrosive as NiFeCr. This is important because the edge of the SAL is exposed at the ABS. Further, corrosion can develop at high temperatures during fabrication of the sensor resulting in a reaction between the SAL and adjacent layers which can dramatically change the properties of the SAL. The preferred ratio of the CoHfNb alloy is $Co_{87}$, $Hf_2$, $Nb_{11}$ and acceptable ranges of ratios are $Co_{79-94}$, $Hf_{1-6}$, $Nb_{5-15}$. The addition of Hf makes the CoHfNb alloy self-passivating.

It is important that the CoNbHf retain its amorphous state. This allows the alloy to be changed in thickness without changing the aforementioned desirable properties for a SAL. It should be noted that both of the elements Hf and Nb reduce the magnetization of Co. At least 5% Nb is added to Co in order to make the alloy amorphous. When this is done a certain amount of the magnetization of Co is lost. Further, when Hf is added to adjust the magnetostriction still more magnetization is lost. Accordingly, the amount of Hf and Nb added to Co should be minimized up to the point where the aforementioned desirable properties are obtained.

We have discovered that by adding Fe to the alloy that the magnetostriction can be driven from a negative value to a near zero value without diluting the magnetization of the alloy. The following Table C shows the results from experiments with CoFeNb based alloys. CoFeHfNb demonstrates normalized rho of 137, magnetostriction of only $0.12 \times 10^{-6}$ and excellent corrosion resistant properties.

TABLE C

| Material | Composition (%) | Thick (Å) | Hc (Oe.) | Hk (Oe.) | Lambda (×10-6) | Normalized Rho ($\mu$ Ohm-cm) |
|---|---|---|---|---|---|---|
| CoFeNb | 87/1/12 | 104.7 | 3.06 | 15.0 | 0.32 | 137 |
| CoFeNb | 87/1.5/11.5 | 105.4 | 1.65 | 14.4 | 0.72 | 144 |
| CoFeNbHf | 87/1/2/11 | 104.9 | 1.66 | 13.97 | 0.12 | 137 |

Fe has an advantage over Hf in that it drives the magnetostriction more quickly in a positive direction than Hf. In a preferred embodiment 1% to 3% Fe is alloyed with CoHfNb.

Figure 10:
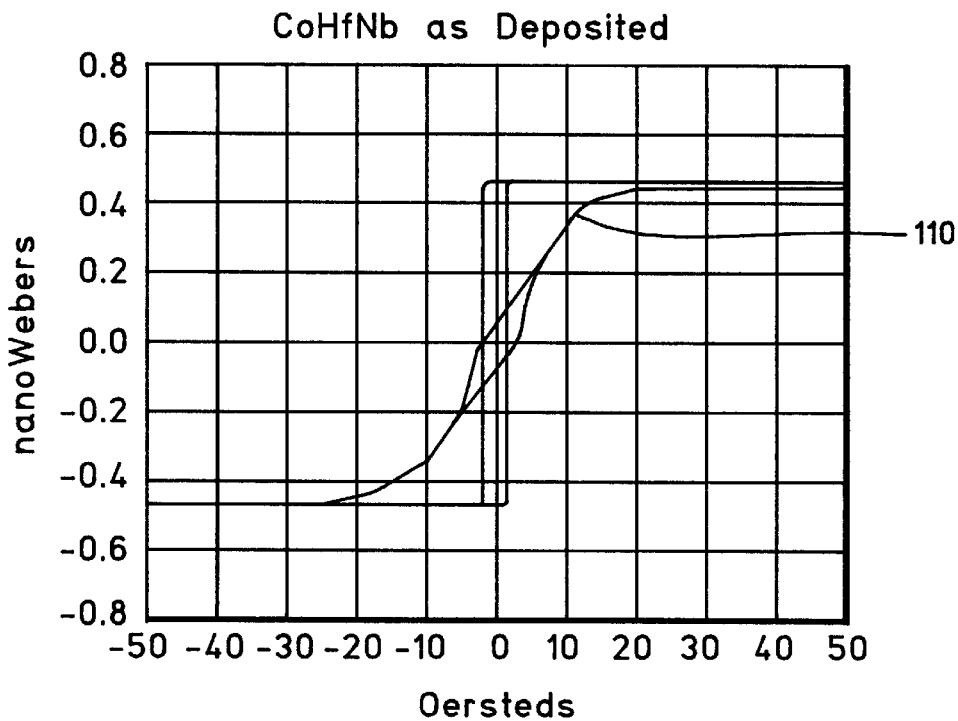
FIG. 10 shows a hysteresis loop of CoNbHf as deposited.
Figure 11:
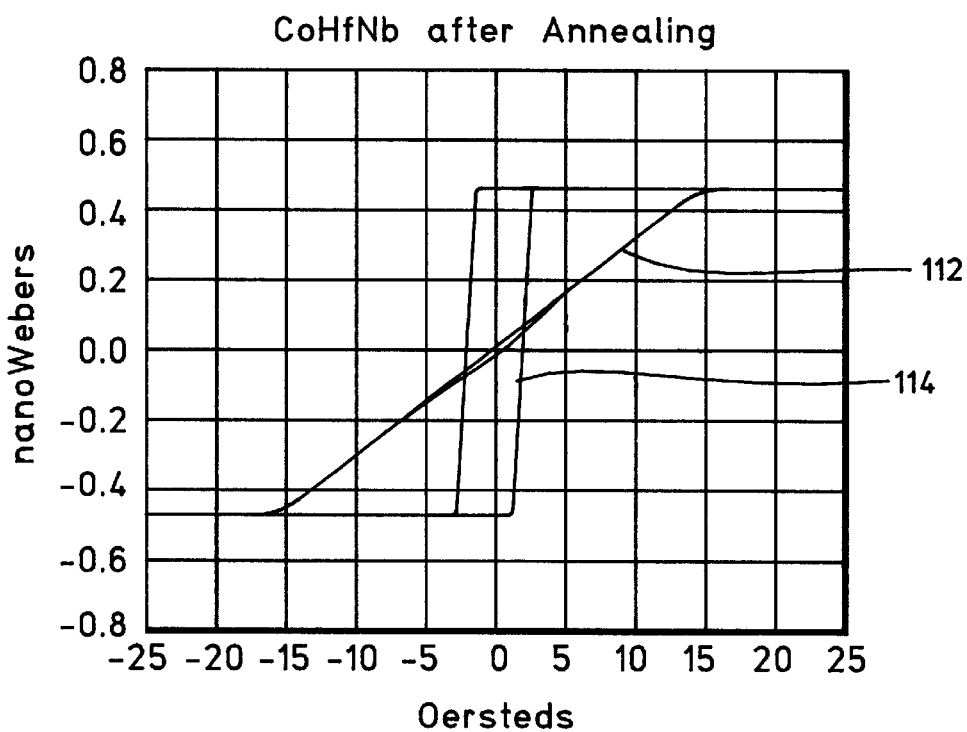
FIG. 11 shows a hysteresis loop of CoNbHf after annealing.

The uniaxial anisotropy HK of CoNbHf is shown as 14.6 Oe after annealing. This is also shown in the graph in FIG. 11. The hard axis loop 110 for CoNbHf before annealing is shown in FIG. 10. The hard axis B/H loop of CoHfNb after annealing is shown at 112 in FIG. 11. It should be noted that the scale on the abscissa of the table in FIG. 10 is twice that of the scale of the abscissa in FIG. 11. There is a slight decrease in coercivity $H_c$ after annealing which tightens the loop 112 and $H_K$ has increased slightly from 13.8 to 14.6 Oe. It should be noted from FIG. 11 that the easy axis loop 114 is very square and the hard axis loop 112 is very closed after annealing. Accordingly, CoHfNb demonstrates well-defined easy and hard axes which means that the material has a well-behaved domain structure. The well-defined easy axis indicates that the material is magnetically uniform. The B/H loops for CoHfNbe are similar to the B/H loops in FIGS. 10 and 11.

The embodiment 90A, shown in FIG. 6, employs a soft adjacent layer 120 of CoHfNb or CoHNbFe and an MR stripe 122 of NiFe (Permalloy). A non-magnetic electrically-insulative tantalum (Ta) layer 124 is sandwiched between the SAL 120 and the MR stripe 122. The MR stripe 122 is sandwiched between the tantalum spacer layer 124 and another spacer layer 126. The embodiment 90A is a typical AMR sensor arrangement.

The embodiment 90B in FIG. 7 is the same as the embodiment 90A except a seedlayer of Ta 128 is employed for the SAL layer 120. The thickness of the Ta seedlayer 128 is 30 Å and the thickness of the tantalum layer 124 is 60 Å. Table D shows the properties of a CoNbHf SAL layer 120 when sandwiched between the tantalum layers 128 and 124.

TABLE D

| Structure | State | Mag. Thick (Å) | Hc (Oe.) | Hk (Oe.) | Lambda (10-6) |
|---|---|---|---|---|---|
| Ta/CoNbHf/Ta | As Dep. | 112 | 1.13 | 12.6 | -2.68 |
| Ta/CoNbHf/Ta | Annealed | 108 | 1.11 | 11.9 | -3.60 |

Before annealing magnetostriction was $-2.68 \times 10^{-6}$ and after annealing the magnetostriction was $-3.60 \times 10^{-6}$. It can be seen that magnetostriction has decreased from -2.6 in Table B to -3.60 in Table D when the CoNbHf layer is sandwiched between the Ta layers. This magnetostriction is still within an acceptable level. It can further be seen from Table D that both the coercivity $H_c$ and the uniaxial anisotropy $H_K$, has decreased. These levels are still within acceptable ranges.

Figure 8:
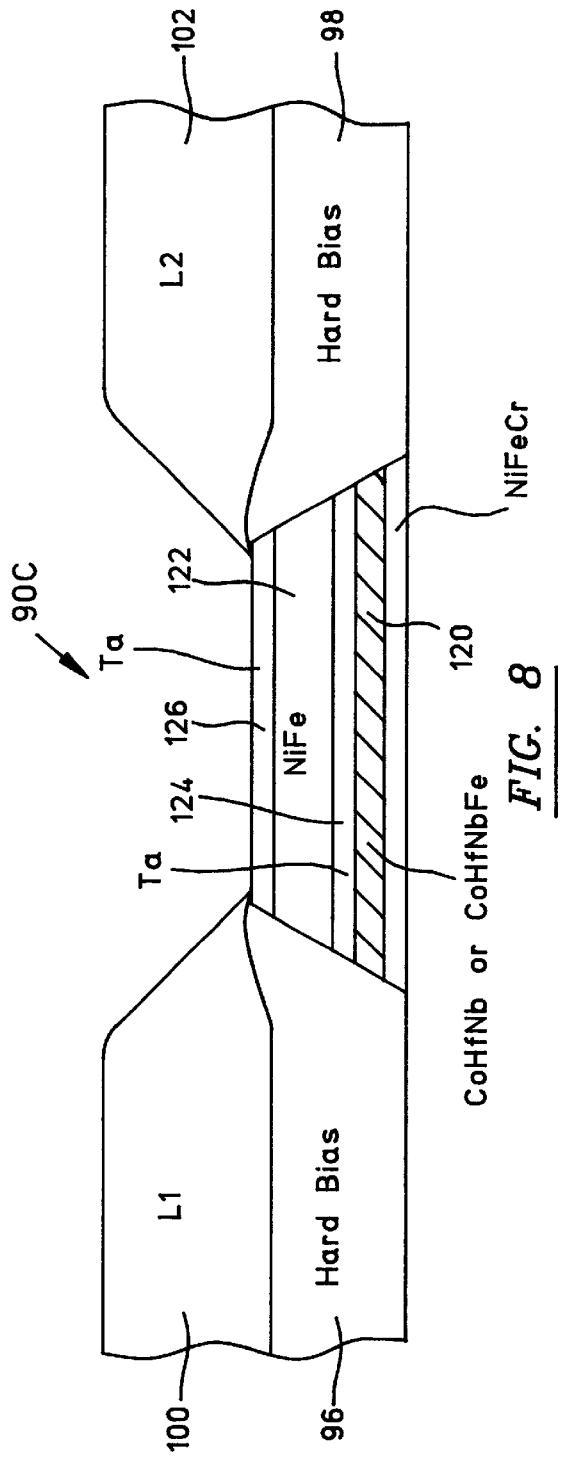
FIG. 8 shows an enlarged ABS view of a third embodiment of the AMR sensor.
Figure 9:
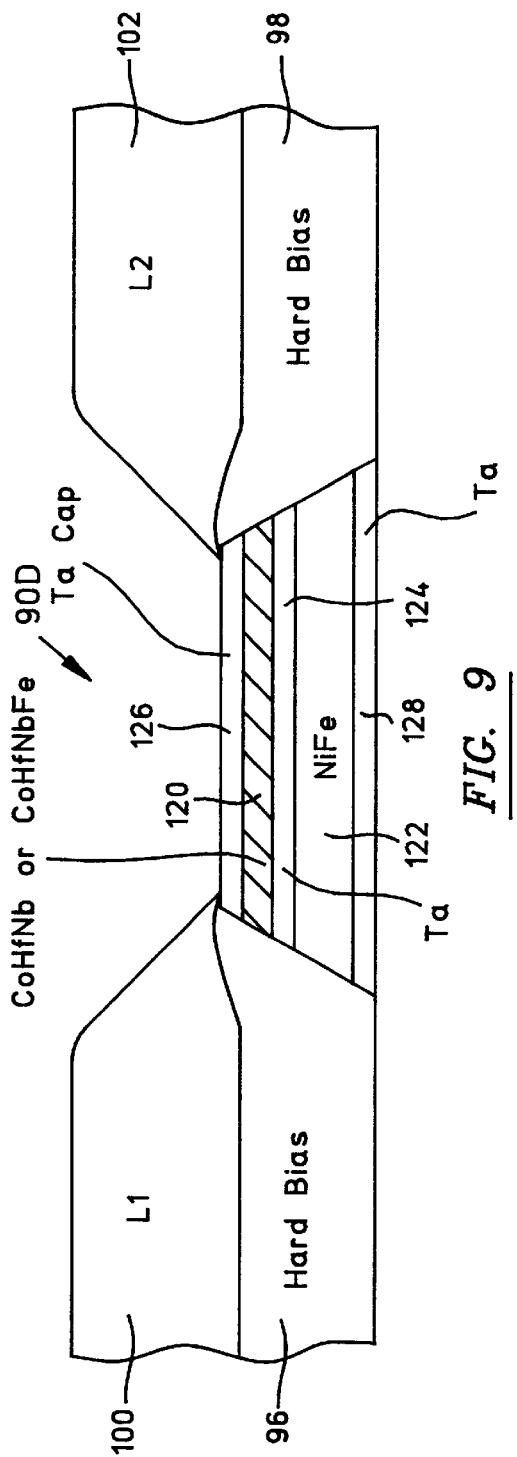
FIG. 9 shows an enlarged ABS view of a fourth embodiment of the AMR sensor.

The embodiment 90C in FIG. 8 is the same as the embodiment 90B in FIG. 7 except NiFeCr is employed as a seedlayer for the SAL layer 120 instead of Ta. The results of this arrangement are shown in Table E.

TABLE E

| Structure | Thickness(Å) | State | Lambda (10-6) |
|---|---|---|---|
| NiFeCr/CoHfNb/Ta | 20/100/60 | As Deposited | 5.3 |
| " | " | Annealed | 5.4 |
| CoHfNb/NiFeCr/Ta | 100/20/60 | As Deposited | 1.26 |
| " | " | Annealed | 4.1 |

The first and second rows in Table E indicate the magnetostriction of this arrangement before and after annealing. It can be seen that after annealing the magnetostriction is $5.4 \times 10^{-6}$ which means that the NiFeCr seedlayer for the SAL layer 120 has changed the magnetostriction from a negative value, as shown in Table D, to a positive value as shown in Table E. Rows 3 and 4 in Table E show the results of an arrangement where the SAL layer CoNbHf is the first layer followed by layers of NiFeCr and Ta. While not shown in the drawings, the magnetostriction of this arrangement is +4.1 after annealing. Again, the NiFeCr adjacent layer increases the magnetostriction of the SAL. Table E shows that excellent magnetostrictions can be obtained for SAL layers of CoBbHf only 100 Å thick.

The embodiment 90D is an inverted MR stripe arrangement which enables the MR stripe 122 to be annealed at temperatures higher than 300° C. in order to improve its magnetoresistance coefficient. When CoHfNb is annealed above 300° C. it changes from an amorphous state to a crystalline state. In this arrangement the MR stripe 122 is sandwiched between the spacer layers 124 and 128 followed by the SAL layer 120 being sandwiched between the spacer layer 124 and the cap layer 126. The NiFe MR stripe can now be deposited at a temperature higher than 300° C. and then the SAL layer 120 can be deposited at a lower temperature so that its amorphous state is ensured. It is desirable that the CoHfNb or CoHfNbFe SAL layer be formed by ion beam sputtering. This makes these alloys with low intrinsic anisotropy so that they can be used for soft adjacent layers in the MR heads.

Figure 12:
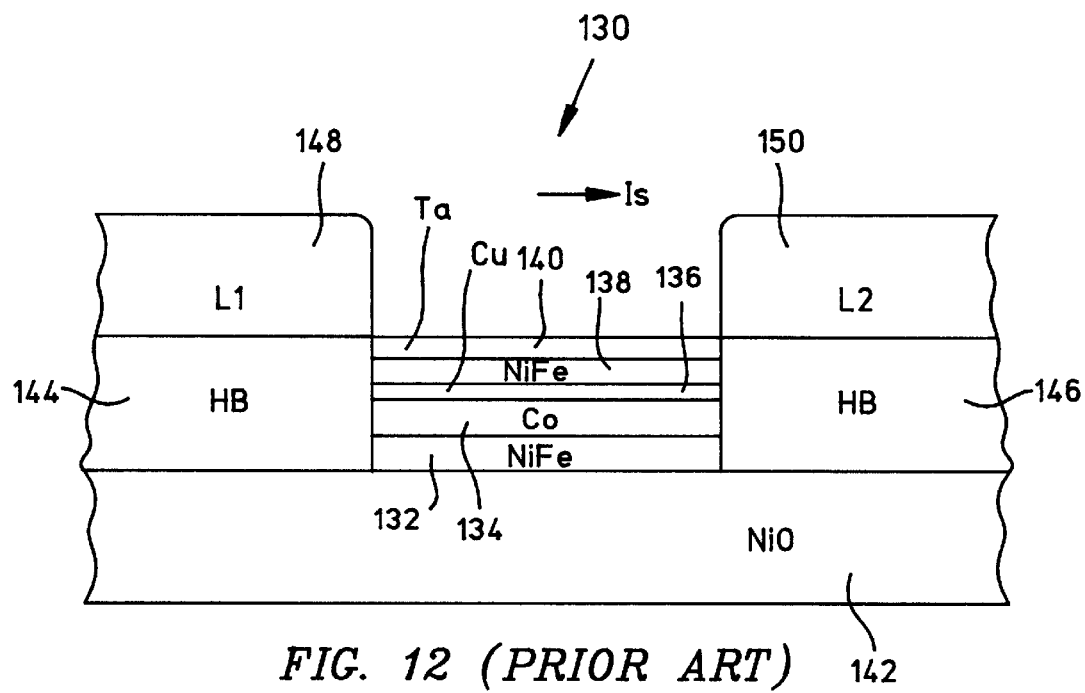
FIG. 12 shows an ABS view of a prior art spin valve sensor.

In FIG. 12, there is shown a prior art spin valve sensor 130 which includes pinned layers 132, 134, a copper spacer layer 136, a free layer 138 and a cap layer of Ta 140. An antiferromagnetic layer of NiO 142 may be employed for pinning the magnetic moments of the layers 132 and 134 into the paper (or out of the paper) perpendicular to the ABS. First and second hard bias layers 144 and 146 stabilize the domain structure of the layers in the MR sensor. The NiO layer 142 may be the first gap layer 54 shown in FIG. 4. The spacer layer 136 has a thickness which is less than the mean free path of conduction electrons flowing between first and second leads 148 and 150. The degree of electron scattering, which depends upon the relative angle between the magnetic moments of the free layer 138 and the pinned layers 132 and 134, determines the resistance of the MR sensor to the sense current $I_S$. The greatest scattering and the corresponding greatest increase in resistance occurs when the magnetic moments are anti-parallel and the least scattering and the corresponding least resistance change occurs when the magnetic moments are parallel with respect to one another. The magnetic moment of the free layer 138 is typically oriented parallel to the ABS so that upon receiving positive and negative field signals from a rotating disk the magnetic moment rotates upwardly or downwardly to decrease or increase the resistance of the sensor. The change in resistance would be opposite if the layers 132 and 134 had their magnetic moments pinned in an opposite direction.

Because of the thinness of the spacer layer 136 and roughnesses at the interfaces, there is a ferromagnetic coupling $H_{FC}$ which is induced on the free layer 138 by the pinned layers 132 and 134. Another field acting on the free layer 138 is a demagnetization field from the pinned layers 132 and 134 which causes an induced demagnetization field $H_{DEMAG}$ on the free layer 138. This is typically on the order of 51 Oe when the spin valve sensor is centered between the first and second shield layers 58 and 60, as shown in FIG. 4. By appropriately controlling the thicknesses of the layers 132, 134, 136 and 138 and the amount of the sense current $I_S$ the ferromagnetic coupling field $H_{FC}$ and the demagnetization field $H_{DEMAG}$ can be made to substantially counterbalance one another so that the magnetic moment of the free layer 138 can be parallel to the ABS.

Unfortunately, as the temperature of the spin valve sensor 130 rises during operation, the exchange field coupling between the antiferromagnetic layer 142 and the pinned layer 132 decreases while the $H_{DEMAG}$ field from the pinned layers 132 and 134 remains substantially constant. At some temperature level the $H_{DEMAG}$ field becomes stronger than the exchange pinning field causing the pinned layers 132 and 134 to become disoriented with a random demagnetizing field. If the demagnetizing field $H_{DEMAG}$ from the pinned layers 132 and 134 could be made zero then the pinned layers 132 and 134 would keep their pinned orientation up to a higher temperature since there is no opposition by the aforementioned $H_{DEMAG}$ field.

Figure 13:
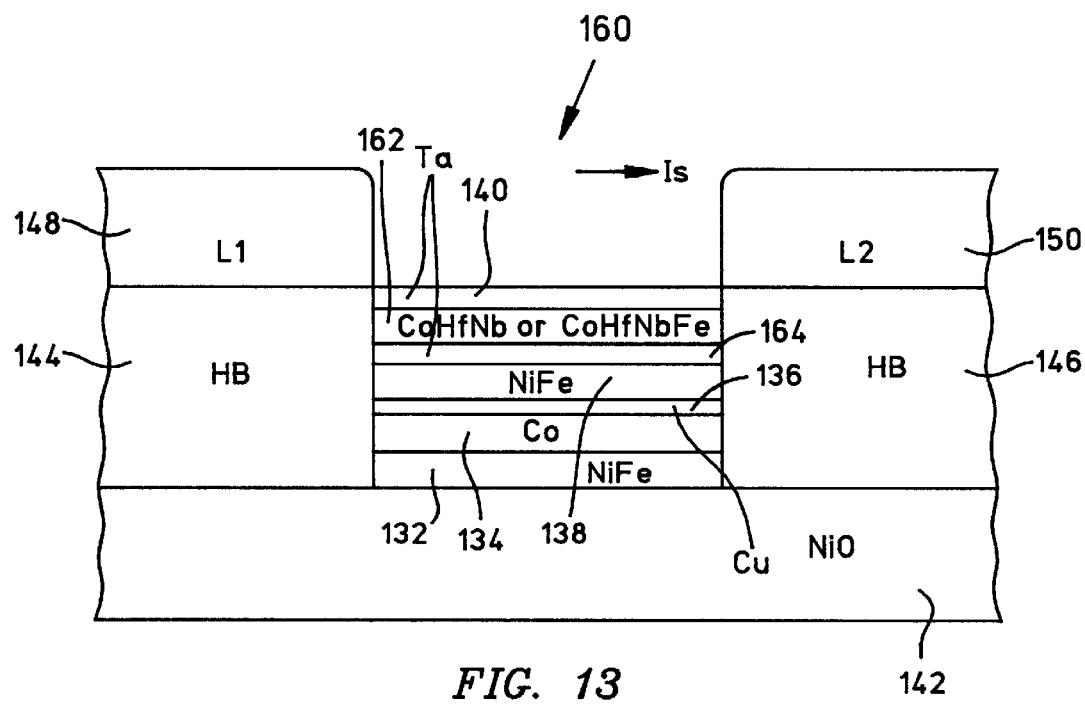
FIG. 13 shows an ABS view of the present spin valve sensor.

In the embodiment 160, shown in FIG. 13, a soft adjacent layer 162 of CoHfNb or CoHfNbFe is employed as a "keeper" layer for reducing the $H_{DEMAG}$ field of the pinned layers 132 and 134 to zero. The SAL 162 is separated from the free layer 138 by a Ta spacer layer 164. The $H_{DEMAG}$ field from the pinned layers 132 and 134 is drawn in by the SAL layer 162 causing the $H_{DEMAG}$ field of the pinned layers 132 and 134 to be zero. Since the $H_{DEMAG}$ field is zero there is no $H_{DEMAG}$ field opposing the exchange pinning field on the layer 132 which means that the pinned layers 132 and 134 remain pinned at higher temperatures. Further, a proper bias for the free layer 138 is now achieved by counterbalancing only the ferromagnetic coupling field $H_{FC}$ with the field from the sense current Is along with proper thicknesses of the layers. All of the desirable properties of a material for a SAL for an AMR sensor also apply to the SAL for the spin valve sensor shown in FIG. 13.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A spin valve read head comprising:
   a spin valve sensor, the spin valve including:
      a ferromagnetic free layer, a ferromagnetic pinned layer and a first non-magnetic spacer layer wherein the pinned layer has a demagnetizing field;
      the first non-magnetic spacer layer being sandwiched between the free and pinned layers;
      a second non-magnetic spacer layer;
      only one keeper layer which at least partially provides flux closure for said demagnetizing field of the pinned layer;
      the second non-magnetic spacer layer being sandwiched between the free layer and the keeper layer; and
      said keeper layer being 79–94% Co, 1–6% Hf and 5–15% Nb.

2. A read head as claimed in claim 1 wherein the magnetostriction of the SAL is zero.

3. A read head as claimed in claim 2 including:
   first and second gap layers;
   the MR sensor being sandwiched between the first and second gap layers;
   first and second shield layers; and
   the first and second gap layers being sandwiched between the first and second shield layers.

4. A combined MR read head and inductive write head including the MR read head of claim 3, the combined head comprising:
   an inductive coil embedded in an insulation stack;
   the insulation stack and the inductive coil being sandwiched between first and second pole pieces; and the first and second pole pieces being spaced by a third gap layer at an air bearing surface.

5. A magnetic disk drive including the combined head as claimed in claim 4, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

6. A read head as claimed in claim 3 wherein said SAL is substantially 87% Co, 2% Hf and 11% Nb.

7. A read head as claimed in claim 6 wherein the SAL has a thickness of substantially 100 Å.

8. A spin valve read head comprising:

a spin valve sensor, the spin valve including:

a ferromagnetic free layer, a ferromagnetic pinned layer and a first non-magnetic spacer layer wherein the pinned layer has a demagnetizing field;

the first non-magnetic spacer layer being sandwiched between the free and pinned layers;

a second non-magnetic spacer layer;

only one keeper layer which at least partially provides flux closure for said demagnetizing field of the pinned layer;

the second non-magnetic spacer layer being sandwiched between the free layer and the keeper layer; and said keeper layer being 77–94% Co, 1–6% Hf, 1–14% Nb and 1–3% Fe.

9. A read head as claimed in claim 8 including:

first and second gap layers;

the MR sensor being sandwiched between the first and second gap layers;

first and second shield layers; and the first and second gap layers being sandwiched between the first and second shield layers.

10. A combined MR read head and inductive write head including the MR read head of claim 9, the combined head comprising:

an inductive coil embedded in an insulation stack;

the insulation stack and the inductive coil being sandwiched between first and second pole pieces; and the first and second pole pieces being spaced by a third gap layer at an air bearing surface.

11. A magnetic disk drive including the combined head as claimed in claim 10, the drive comprising:

a frame;

a magnetic disk rotatably supported on the frame;

a support mounted on the frame for supporting the combined head in a transducing relationship with the magnetic disk;

means for rotating the magnetic disk;

positioning means connected to the support for moving the head to multiple positions with respect to said magnetic disk; and means connected to the head, to the means for rotating the magnetic disk and to the positioning means for exchanging signals with the combined head, for controlling movement of the magnetic disk and for controlling the position of the combined head.

12. A read head as claimed in claim 9 wherein said SAL is substantially 87% Co, 2% Hf, 10% Nb and 1% Fe.

13. A read head as claimed in claim 12 wherein the SAL has a thickness of substantially 100 Å.

* * * * *